US009421715B2

(12) United States Patent
Hartmann et al.

(10) Patent No.: US 9,421,715 B2
(45) Date of Patent: Aug. 23, 2016

(54) THREE-DIMENSIONAL PRINTER

(75) Inventors: Anders Ørnsholt Hartmann, Copenhagen K (DK); Frederik Walsted Tjellesen, Copenhagen V (DK)

(73) Assignee: BLUEPRINTER APS, Copenhagen N (DK)

( * ) Notice: Subject to any disclaimer, the term of this patent is extended or adjusted under 35 U.S.C. 154(b) by 864 days.

(21) Appl. No.: 13/501,138

(22) PCT Filed: Oct. 11, 2010

(86) PCT No.: PCT/EP2010/065230
§ 371 (c)(1),
(2), (4) Date: Apr. 10, 2012

(87) PCT Pub. No.: WO2011/045291
PCT Pub. Date: Apr. 21, 2011

(65) Prior Publication Data
US 2012/0201960 A1     Aug. 9, 2012

(30) Foreign Application Priority Data
Oct. 13, 2009  (GB) ................................... 0917936.7

(51) Int. Cl.
*B29C 67/00* (2006.01)

(52) U.S. Cl.
CPC ......... *B29C 67/0077* (2013.01); *B29C 67/0062* (2013.01)

(58) Field of Classification Search
CPC ............ B29C 67/0062; B29C 67/0077; B29C 67/0051; B29C 33/08; B29C 33/085; B22F 3/1055

USPC ......................... 425/189, 375, 174.6
See application file for complete search history.

(56) References Cited

U.S. PATENT DOCUMENTS

| | | | |
|---|---|---|---|
| 5,143,817 A | 9/1992 | Lawton et al. | |
| 5,171,490 A * | 12/1992 | Fudim .................. | B29C 67/007 264/308 |
| 5,192,559 A | 3/1993 | Hull et al. | |
| 5,578,155 A | 11/1996 | Kawaguchi | |
| 5,939,008 A | 8/1999 | Comb et al. | |
| 6,201,557 B1 | 3/2001 | Kitazawa et al. | |
| 6,213,168 B1 | 4/2001 | Gaylo et al. | |
| 6,229,556 B1 | 5/2001 | Venkataraman | |
| 6,331,868 B1 | 12/2001 | Yamade et al. | |
| 6,450,393 B1 | 9/2002 | Doumanidis et al. | |
| 6,531,086 B1 * | 3/2003 | Larsson .............. | B29C 67/0077 264/109 |

(Continued)

FOREIGN PATENT DOCUMENTS

| | | |
|---|---|---|
| DE | 199 52 000 | 5/2001 |
| DE | 10 2007 040 755 | 3/2005 |

(Continued)

*Primary Examiner* — Yogendra Gupta
*Assistant Examiner* — Ninh Le
(74) *Attorney, Agent, or Firm* — Leason Ellis LLP

(57) ABSTRACT

A printer (106) for building a three-dimensional model by sequential deposition of a plurality of cross-sectional layers by using a thermal print head (1) movable relative to a material bed (102) over a deposited layer. A protective sheet (3) is disposed between the thermal head (1) and deposited layer. Temperature control of the material bed (102) to prevent warping of the model is provided by an independently heatable cover (52, 58) in contact with the surface of the material bed (102) e.g. via the protective sheet (3).

10 Claims, 5 Drawing Sheets

(56) References Cited

U.S. PATENT DOCUMENTS

| | | |
|---|---|---|
| 6,589,471 B1 | 7/2003 | Khoshnevis |
| 6,656,410 B2 | 12/2003 | Hull et al. |
| 6,780,368 B2 | 8/2004 | Liu et al. |
| 6,799,959 B1 | 10/2004 | Tochimoto et al. |
| 6,905,645 B2 | 6/2005 | Iskra |
| 6,930,278 B1 | 8/2005 | Chung et al. |
| 6,966,960 B2 | 11/2005 | Boyd et al. |
| 7,291,242 B2 | 11/2007 | Khoshnevis |
| 7,828,022 B2 | 11/2010 | Davidson et al. |
| 7,887,316 B2 | 2/2011 | Cox |
| 7,964,047 B2 | 6/2011 | Ishida |
| 2001/0050448 A1 | 12/2001 | Kubo et al. |
| 2002/0149137 A1 | 10/2002 | Jang et al. |
| 2003/0059492 A1 | 3/2003 | Gaillard et al. |
| 2004/0173945 A1* | 9/2004 | Khoshnevis ........ B29C 67/0077 264/497 |
| 2004/0200816 A1 | 10/2004 | Chung et al. |
| 2004/0224173 A1 | 11/2004 | Boyd et al. |
| 2004/0254665 A1 | 12/2004 | Fink et al. |
| 2005/0161146 A1 | 7/2005 | Graf |
| 2005/0208168 A1 | 9/2005 | Hickerson et al. |
| 2005/0242473 A1 | 11/2005 | Newell et al. |
| 2005/0263934 A1 | 12/2005 | Chung et al. |
| 2006/0071359 A1 | 4/2006 | Monsheimer et al. |
| 2006/0118532 A1 | 6/2006 | Chung et al. |
| 2006/0124231 A1 | 6/2006 | Nonoyama et al. |
| 2006/0157454 A1 | 7/2006 | Larsson |
| 2006/0228248 A1 | 10/2006 | Larsson |
| 2006/0270070 A1 | 11/2006 | Nishimura et al. |
| 2007/0179656 A1 | 8/2007 | Eshed et al. |
| 2007/0298182 A1 | 12/2007 | Perret et al. |
| 2008/0111271 A1 | 5/2008 | Khoshnevis |
| 2008/0131104 A1 | 6/2008 | Philippi |
| 2008/0156263 A1 | 7/2008 | Montero-Escuder et al. |
| 2008/0203621 A1 | 8/2008 | Mattes |
| 2009/0045553 A1 | 2/2009 | Weidinger et al. |
| 2009/0068376 A1 | 3/2009 | Philippi et al. |
| 2009/0072450 A1 | 3/2009 | Wallgren et al. |
| 2009/0152771 A1 | 6/2009 | Philippi et al. |
| 2009/0206522 A1 | 8/2009 | Hein et al. |
| 2010/0007062 A1 | 1/2010 | Larsson et al. |
| 2010/0012630 A1 | 1/2010 | Leuterer |
| 2010/0217429 A1 | 8/2010 | Kritchman et al. |
| 2010/0228381 A1 | 9/2010 | Matsui et al. |
| 2011/0241947 A1 | 10/2011 | Scott et al. |
| 2011/0293770 A1 | 12/2011 | Ackelid et al. |

FOREIGN PATENT DOCUMENTS

| | | | |
|---|---|---|---|
| DE | 103 53112 | 6/2006 | |
| EP | 0 712 050 A2 | 5/1996 | |
| EP | 0 737 130 | 9/1997 | |
| EP | 0 846 549 | 6/1998 | |
| EP | 1 879 173 | 1/2008 | |
| EP | 1879731 | 1/2008 | |
| EP | 1 583 652 | 2/2011 | |
| JP | 09117963 | 5/1997 | |
| JP | 2000079648 | 3/2000 | |
| JP | 2001205708 A * | 7/2001 | ............ B29C 67/00 |
| WO | WO 98/51464 A1 | 11/1998 | |
| WO | WO 99/59812 | 11/1999 | |
| WO | WO 2008/049384 | 5/2008 | |
| WO | WO 2010/074566 A1 | 7/2010 | |
| WO | WO 2011/000188 | 1/2011 | |
| WO | WO 2011/001270 | 1/2011 | |
| WO | WO 2011/026563 | 3/2011 | |
| WO | WO 2011/065920 | 6/2011 | |

* cited by examiner

THREE-DIMENSIONAL PRINTER

CROSS REFERENCE TO RELATED APPLICATIONS

This patent application is a National Stage Application under 35 U.S.C. 371 of International PCT Patent Application No. PCT/EP2010/065230, filed on Oct. 11, 2010, which claims the benefit of Great Britain Application Serial No. 0917936.7, filed Oct. 13, 2009, which are hereby incorporated by reference in their entirety herein.

FIELD OF THE INVENTION

The invention relates to a three-dimensional printer, e.g. suitable for use as rapid prototyping apparatus, in which a three-dimensional model is built by successive deposition of a plurality of layers.

BACKGROUND TO THE INVENTION

There are many different technologies currently used to build physical three-dimensional models using additive manufacturing technology, e.g. building a model layer by layer. Typically, a virtual design of the three-dimensional model, e.g. represented through computer-aided design (CAD) software or the like, is transformed into a plurality of thin (quasi-two-dimensional) cross-sectional layers which are built on one another in succession.

There are a number of known ways in which the cross-sectional layers may be formed. For example, it is known to sinter a selected sub-region of a deposited area of green material, e.g. by guiding a laser beam over the sub-region. Such an arrangement is disclosed in WO 2004/056512. Another example involves the use of a two-dimensional heat or light source arranged to melt or cure all of a selected sub-region at the same time by masking out the areas not to be melted. Such an arrangement is disclosed in US 2002/0149137.

Other techniques may involve extruding or otherwise depositing green material already in the correct shape of the cross-sectional layer (e.g. by reference to an x-y-z-table constructed from the virtual design data). The deposited material may then harden naturally or be cured (e.g. by a powerful light source) to form the desired cross-sectional layer.

In a yet further example, each desired cross-sectional layer may be cut out of a sheet material, wherein the model is built by gluing together the cut-out layers.

US 2005/208168 discloses a technique in which a desired cross section is formed on the surface of a heated drum and subsequently transferred from the drum onto and fused together with previously deposited layers.

US 2004/0224173 discloses a Solid Freeform Fabrication tool in which a three-dimensional model is built from heating successive films formed of a mixture of thermoplastic particles and a water-soluble polymer matrix using a thermal head.

SUMMARY OF THE INVENTION

At its most general, a first aspect of the present invention proposes the use of a thermal head as a means of selectively heat-treating successive layers of green material to create a plurality of cross-sectional layers forming a three-dimensional model.

Herein "green material" means any material capable of flowing or being extruded into a layer that can subsequently be selectively solidified through heat treatment. For example, the green material may be a flowable medium, such as powder or the like, or an extrudable medium, such as unsintered ceramic, paste or the like. Solidification through heat treatment is arranged to fixed the shape of the heat-treated region, e.g. through any one of melting, sintering, curing or hardening. Herein "curing" may refer to any one or more of chemical hardening, thermal hardening and vaporization hardening. The term "heat-treating" may thus refer to any one or more of melting, sintering, curing or hardening.

In this disclosure, the term "thermal head" may be used generically to mean a device having a plurality of selectively activatable heating elements that are arranged to emit heat energy therefrom. The thermal head may have a heat emitting region, e.g. edge or surface, arranged to contact an area, e.g. by sweeping across it. A selectable sub-region of the area may be heated by suitable activating and deactivating the heating elements as the heat emitting region is swept over the area. Some examples of thermal heads are known in the field of thermal printers, where a printed image can be formed by selectively heating thermochromic paper. The present invention may adapt this technology for use in a three-dimensional printer.

According to the first aspect of the invention, there may be provided a printer for building a three-dimensional model by sequential deposition of a plurality of cross-sectional layers, the printer comprising: a material bed; a layer depositing mechanism for depositing a layer of flowable green material on the material bed; and a thermal head movable relative to the material bed over the deposited layer, wherein the thermal head comprises an array of selectively activatable heating elements arranged to transfer thermal energy by conduction to heat-treat a selectable area of green material in the deposited layer.

The printer may operate according to a method comprising the following steps: (i) laying out a thin layer of the flowable material on the material bed; (ii) heat treating a desired area of the layer by selectively applying heat via the thermal head (and not affecting the parts of the layer outside the desired area) to form a cross-sectional layer of the model; (iii) laying out a successive layer on top of the previous layer; (iv) heat treating a desired area of that successive layer to form the next cross-sectional layer; (v) repeating steps (iii) and (iv) until the three-dimensional model is built and (vi) removing the untreated green material from the material bed to leave the desired three-dimensional shape. The heat treating step (iv) may include fixing (e.g. fusing) the desired area of the successive layer to the heat treated area of the previous layer.

Herein "flowable" may include powdered material, liquids and extrudable material, e.g. pastes or the like. Powdered material may be preferred.

The thermal head may thus be moved relative to the material bed to bring it into thermal communication with the deposited layer. The array of selectively activatable heating elements may comprise an arrangement (e.g. pattern) of heating elements, e.g. heating resistors or the like, that sweeps over the deposited layer in use, the area swept out being an active region in which heat treatment can take place. The arrangement may comprise one or more rows (e.g. one or more straight rows) of heating elements or a pattern of heating elements in which adjacent heating elements are offset from one another in the printing direction. Each point on the deposited layer in the active region may be uniquely addressed by the coordinate (n,t), where n is an identifier for a heating element and t is a time during the sweeping operation. The selectable area of green material may be represented using such coordinates, e.g. transformed from cross-sectional data extracted from virtual design data, which may be represented by an STL, IGES, STEP file or the like converted from a CAD model. The methods and software for identifying the successive cross-sectional areas and providing appropriate instructions to the individual heating elements correspond to equivalent methods known in conventional three-dimensional printing and direct thermal printing respectively and are therefore not discussed in detail herein.

Each layer may lie on a flat plane on the material bed. The thermal head and the material bed may be movable relative to one another in a direction normal to the plane of each deposited layer. In one embodiment, the material bed may be lowered by a predetermined distance following each pass of the thermal head. This may permit the device to accommodate a greater number of layers. The thermal head may be a conventional "corner edge", "true edge" or "near edge" type used for printing on flat media.

The printer may include a movement mechanism (e.g. a DC motor such as a stepper motor, servo motor or the like) for moving the thermal head on a fixed path relative to the material bed. The array of selectively activatable heating elements may extend in a line, on the plane of the material bed, that is at an angle relative to (e.g. orthogonal to) the direction of the fixed path, whereby the heating elements sweep out an area as the thermal head moves on the fixed path. The heating elements may lie on a line that is orthogonal to the fixed path. The fixed path may be linear, e.g. along a longitudinal dimension of the material bed parallel to the plane of the deposited layer. The line of heating elements may extend across the full width of the material bed. The material bed may be oblong in plan view, e.g. with a oblong base having upstanding side walls, which may have varying height. Each deposited layer may be an oblong plate-like element.

As explained above, the printer is arranged to sequentially deposit a plurality of cross-sectional layers. Each successive cross-sectional layer may be deposited on top of the previous layer. In addition to transforming (e.g. solidifying) the green material, the heat-treatment may act to bond the heat-treated area of one layer to any heat-treated material that it contacts in the layer below. In this way, the printing operation may ensure the structural integrity of the three-dimensional model when the untreated green material is removed.

The deposited layer may be laid out by a mechanism that is separate from the thermal head. However, in one embodiment, apparatus for depositing the layer may be movable with the thermal head over the material bed, whereby the steps of depositing and heat-treating can be performed in a single pass over the material bed. In this embodiment, the apparatus may be mounted in front of the thermal head on its path over the material bed.

The apparatus for depositing the layer may comprise any known means for laying out a layer of flowable (e.g. formable) material having substantially uniform thickness. For example, if the material is flowable powder, the apparatus may include a spreading element (e.g. angled blade) for substantially evenly distributing the green material over the bed.

A compacting element (e.g. roller, stamping member or tapering wedge element) may be provided to compress the green material. Compressing the green material may promote efficient transformation, e.g. by improving the bulk thermal conductivity of the cross-sectional layer, and may provide better mechanical stability for supporting for the model under construction. The compacting element may be incorporated into the apparatus for depositing the layer, or may be a standalone device, e.g. for performing compaction after the layer is deposited but before the thermal head performs its pass. Preferably, the compacting element includes a tapering wedge element which is arranged to travel over the material bed. The wedge element may have a sloping surface, which is arranged to gradually reduce the clearance between the material bed and compacting element in the direction of travel of the wedge element.

The heat-treatment described herein is arranged to cause a transformation (e.g. transition) of the green material into a fixed solidified state. In other words, the heat-treatment fixes the shape of the selected area of the deposited layer.

The printer may include an advance heater arranged to pre-heat the green material before the thermal head moves on its path over the deposited layer. The advance heater may be combined with the compacting element. Pre-heating the green material may act to bring it closer to the temperature at which it transforms into the fixed state. The amount of heating then required by the thermal head to effect transformation may thus be reduced, which may speed up the overall process. Moreover, since the heat from the advance heater may be conducted to the heat-treated material in the previous layers, the temperature of the material bed as a whole may be maintained, which can reduce or minimise the thermal tensions experienced by the treated material, thereby reducing warping of the model under construction. For a similar reason, the printer may include a post-treatment heater, which may act to regulate the temperature of the material bed following heat treatment. The concept of controlling the temperature of the material bed may represent a further aspect of the invention, which is discussed below.

In one embodiment, the advance heater is arranged to bring the deposited layer to a temperature that is slightly, e.g. 5-10° C., below the transformation temperature. The post-treatment heater may be arranged to bring the heat-treated material to substantially the same temperature. The advance heater and/or the post-treatment heater may heat the material by conduction, i.e. may comprise cover plates for contacting the exposed material.

During heat-treatment there is relative movement between the deposited layer and the heating elements on the thermal head. To prevent the heat-treated material from adhering to the heating elements, which would disrupt the building process and eventually cause overheating and failure of the thermal head, the printer may comprise a protective cover (e.g. sheet, coating or the like) beneath the thermal head. During heat treatment the protective cover (referred to herein as a "protective sheet") is therefore disposed between the heating elements and the deposited layer.

The protective sheet may move with the thermal head or may move relative to both the deposited layer and thermal head during heat treatment. In a preferred embodiment, the protective sheet may be decoupled from the relative movement of the thermal head and deposited layer in a manner where at the location of the thermal head as it moves relative to the material bed the protective sheet is substantially stationary relative to the deposited layer. In one embodiment, the protective sheet is brought into contact with the deposited layer at the same time as the material is compacted. For example, the protective sheet may be fed under the wedge element described above. The advance heater may thus contact the deposited layer through the protective sheet. To avoid sticking to the deposited material, the protective sheet is preferably made from a material exhibiting good non-stick properties, e.g. PTFE (e.g. glass fibre reinforced PTFE), pure silicone, silicone impregnated paper, polyimide or the like. Since the protective sheet is to transfer heat from both the thermal head and the advance heater, a thin layer of material may be used to facilitate heat transfer by conduction. Preferably the protective sheet is made from a material with good thermal conductivity.

Use of a protective cover in a printer for building three-dimensional models by heat treatment may be another aspect of the invention. According to this aspect, there may be provided a printer for building a three-dimensional model by sequential deposition of a plurality of cross-sectional layers, the printer comprising: a material bed; a layer depositing mechanism for depositing a layer of green material on the material bed; a heat source arranged to generate thermal energy for heat-treating a selectable area of green material in the deposited layer; a protective cover disposed between the deposited layer and the heat source in contact with the selectable area during heat-treatment; a separator for separating the protective cover from the selectable area after heat-treatment; and a temperature regulating element in thermal communication with the deposited layer to control cooling of the deposited layer after heat-treatment but before separation of the protective cover from the selectable area. The temperature regulating element permits control of the cooling of the deposited layer to optimise the separation process in terms of minimising warping of the heat-treated layers. The temperature regulating element may be incorporated into the separator itself. For example, it may incorporate a heat sink or its temperature may be independently controllable to provide a temperature gradient across the protective sheet that is suitable for cooling.

The heat source in this aspect of the invention need not be limited to the thermal head. For example, a movable single heat source (e.g. laser) or an array or multiple heat sources may be used.

The protective sheet may be made from a thermally conductive material which is easily separable from (i.e. is resistant to bonding with) the green material and heat-treated (transformed) material.

In one embodiment, the protective sheet may be disposable. For example, the protective sheet may be supplied from a roll at one end of the apparatus. The sheet may renew itself by moving with respect to the material bed, e.g. gradually by moving a small amount (e.g. 1-2 mm) for each pass of the thermal head, or completely renewing for every pass of the thermal head.

To facilitate removal of the heat-treated material from the sheet, the modelling software may be arranged to assess each of plurality of cross-sectional layers for potential areas of weakness and, where such areas of weakness are identified, to add to the cross-sectional layer anchor elements for supporting those areas during separation. Each anchor element may be a discrete region of heat-treated material connected to the area of weakness at an anchor point. Herein discrete region may mean that the anchor element is joined only to the area of weakness at the anchor point, i.e. it is not connected to any other part of the three-dimensional model. An area of weakness may be identified as the first layers of a small object, e.g. where there is no underlying layer for it to be attached to. Preferably, the anchor element for an area of weakness is positioned before the area weakness in the direction of travel of the thermal head over the material bed. In other words, the anchor element may be separated from the protective sheet before the area of weakness. Each area of weakness may have two or more anchor elements connected to it, e.g. positioned before and after the area of weakness in the direction of travel of the thermal head. The anchor elements may be shaped to have edges that are angled to the direction of travel of the thermal head. In this way, the line at which separation of the protective sheet from the cross-sectional layer occurs is prevented from lying along (i.e. parallel to) a line of transition between green material and heat-treated material. This features facilitates separation. The anchor elements may be broken off (e.g. snapped off or cut away) after the three-dimensional model is finished and the excess green material removed. The anchor point may be arranged to have a small area of contact with the model so that separation is easy.

The printer may comprise a contact portion for moving over the material bed. The contact portion may comprise one or more or all of the layer depositing apparatus, the compacting element, the advance heater, the thermal head, the separator and the post-treatment heater arranged in order along the path of travel over the material bed. The contact portion may include the protective sheet, e.g. as a loop that includes a portion that travels under the advance heater, the compacting element and thermal head on towards the separator and post-treatment heater (if present). However, as mentioned above, the protective sheet may be a separate component. In that case, the contact portion may be arranged to move relative to the protective sheet. The contact portion may include a sheet receiving portion, e.g. a roller or the like, to receive the sheet and feed it between the advance heater and deposited layer. The sheet receiving portion may be incorporated as part of the layer depositing apparatus.

As mentioned above, the contact portion may also include the separator (also referred to herein as a sheet separating portion). In one embodiment, the protective sheet may be urged into tension away from an equilibrium position as it is brought into contact with the deposited layer. The sheet separating portion may be arranged to facilitate an abrupt return to the equilibrium position on exiting the contact portion. For example, the sheet separating portion may comprise a sharp trailing edge within the contact portion and a guide element (e.g. roller or the like) arranged to lift the sheet away from the deposited layer at the sharp edge. Other separation techniques may be used, e.g. forcing a sharp edge between the protective sheet and heat treated layer, or applying further tension to stretch the protective sheet, or applying an ultrasonic signal to the sheet. As mentioned above, following separation, the protective sheet may be guided between the deposited material and the post-treatment heater.

The contact portion may include a cooling element (e.g. heat sink or the like) located after the thermal head along the path of travel over the material bed. The cooling element may thus move over the heat treated area after treatment. The purpose of the cooling element is to cool down the heat-treated area so that it solidifies with enough structural integrity to be separated from the protective sheet by the separator. To prevent unwanted warpage, the rate of cooling should not be too fast, so the cooling element may by temperature-regulated body having an independently controllable temperature arranged to provide a temperature gradient across the protective sheet that is suitable for cooling at a desired rate. Thus, for example, the cooling element may be maintained at a temperature that is a predetermined number of degrees lower than the temperature of the advance heater and/or post-treatment heater. For example, the cooling element may have a temperature in a range that is somewhat, e.g. 10-20° C., below the melting point of the green material. The cooling element by be integrated with the separator.

The contact portion may be an independent aspect of the invention, e.g. as a printing assembly suitable for movably mounting on a material bed to create a printer for building a three-dimensional model.

The printer may possess more than one thermal head. For example, the contact portion may comprise a plurality of thermal heads arranged in series along the direction of travel over the deposited layer or adjacent one another in a line to sweep out a larger area.

In one embodiment, the contact portion may be reversible, i.e. capable of performing material deposition and printing in both directions across the material bed. This arrangement may be desirable because the overall printing operation may be faster, and because bi-directional printing may facilitate maintaining a consistent temperature profile across the material bed.

The reversible contact portion may be provided by interchanging the roles of the advance heater and post-treatment heater, by having a pair of layer depositing mechanisms at opposite sides of the contact portion, each of which is switchable in and out of operation as required (e.g. by lowering and raising a spreading blade), and by combining the functions of the compacting element, separator and cooling element into a single dual-function component, one of which is provided on each side of the thermal head. The dual-function component may comprise an elongate member that extends across the material bed and is rotatable about an axis along its length to bring either a compacting surface or a separating/cooling surface into contact with the deposited layer according to the desired function. The elongate member may have an L-shaped cross-section, with each leg of the L providing one of the compacting surface and the separating/cooling surface.

Alternatively or additionally, the material bed may be arranged to rotate relative to the direction of movement of the contact portion. This arrangement may effectively permit bi-directional printing (or quad-directional printing, or even omni-directional printing) whilst permitting the contact portion to retain a unidirectional configuration.

Other aspects of the invention may include a method of creating a three-dimensional model using the printer disclosed above. The contact portion, e.g. comprising the layer depositing mechanism and thermal head in an integral unit, optionally with one or more of the advance heater, the compacting element, the separator, and the post-treatment heater may be a further independent aspect of the invention.

A further independent aspect of the invention concerns the apparatus for and method of controlling the temperature of the deposited material by using a cover in contact with the deposited material, which has an independently controllable temperature for regulating the temperature of the deposited material by conduction. According to this aspect of the invention there is provided a printer for building a three-dimensional model by sequential deposition of a plurality of cross-sectional layers, the printer comprising: a material bed; a layer depositing mechanism for depositing a layer of green material on the material bed; a heat source arranged to generate thermal energy for heat-treating a selectable area of green material in the deposited layer; and a cover in contact with the deposited layer, wherein the cover has an independently controllable temperature for regulating the temperature of the deposited material. The cover may comprise the advance heater and post-treatment heater discussed above. It may contact the deposited material through the protective sheet. For example, in one embodiment the cover may comprise two independently heatable plates, which lie over and substantially cover the deposited material on each side of the thermal head. This aspect of the invention permits the temperature gradient through the material bed to be minimised, which can reduce warpage of the resulting model. This arrangement may be more practical than providing temperature control for the entire environment in which the printer exists.

BRIEF DESCRIPTION OF THE DRAWINGS

Detailed embodiments of the invention are discussed below with reference to the accompanying drawings, in which.

DETAILED DESCRIPTION; FURTHER OPTIONS AND PREFERENCES

In the embodiments discussed below, a conventional thermal print head is being used. Such print heads are known from printers that use thermo-sensitive print paper. These printers are typically used to print receipts and are also known to be the primary printer type used in old fax machine. For example, the thermal print head may be the corner edge model KCE-107-12PAT2 from Kyocera or the near edge model SH2004-DC70A from Rohm. The operating principles of the these thermal print heads are the same: a series of closely placed electrical resistors, which can be switched on and off individually, are located at the edge of the thermal head closest to the surface on which printing is to occur. Applying current to an electric resistor causes it to heat up. In the normal printing-on-paper configuration the heat from the individual heat elements are transferred to a thermo-sensitive paper which will turn black in the specific area heated. By moving the heat sensitive paper relative to the print head and selectively activating the individual electrical resistors a desired pattern can be printed on the paper.

As mentioned above, the selective activation of the individual heating elements is determined using conventional manipulation of CAD model data. Known layer-by-layer rapid prototyping machines use the same data-handling techniques to construct cross-sections from the three-dimensional model data. The constructed cross-sections represent two-dimensional images that are printable by the thermal print heads discussed above. In one example, the CAD model data is converted into a STL format, which is sliced into a number of cross-section, each cross-section having a thickness set to be equal to the deposited layer thickness of the printer. As the data handling techniques are well-known to the skilled addressee, they are not discussed further herein.

Figure 1:
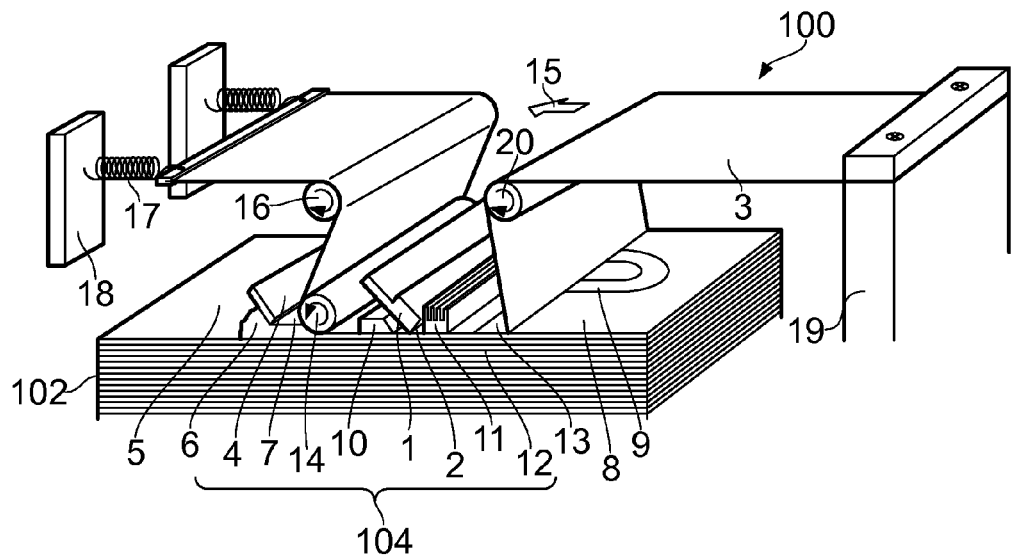
FIG. 1 is a schematic perspective view of a three-dimensional printer that is an embodiment of the invention.

FIG. 1 shows a complete printer 100 that is an embodiment of the invention. The printer 100 comprises a contact portion 104 formed of a number of components (described below) that is movable relative to a material bed 102 via a linear movement mechanism (not shown). The material bed 102 is depicted in FIG. 1 as a plurality of deposited layers. In practice it may be a tray or bath having upstanding side walls for containing the deposited material. The liner movement mechanism may be of any conventional type, e.g. a rack and pinion apparatus or linear actuator or the like.

In one embodiment, the material bed may be formed with flexible walls to prevent a build-up of green material occurring at the edges of the material bed. The flexible walls may be made of a closed-cell elastic material such as silicone. As the angled blade travels over the edge of the material bed, the walls may flex to prevent excess deposition and/or compaction.

The contact portion 104 comprises a thermal head 1 (which in the conventional thermal print head mentioned above) having an array (e.g. a plurality) of selectively activatable heating elements arranged along an edge 2 thereof. The thermal head 1 is arranged over the material bed 102 so that the edge 2 lies across the bed and hence sweeps out an area over the bed when the thermal head 1 is moved in direction of arrow 15 by the linear movement mechanism.

In this embodiment, the components in the contact portion 104 are arranged to operate in one direction, but the invention may be embodied using a reversible contact portion, e.g. one having a double set of the components discussed below on each side of the thermal head. One example of a reversible arrangement is discussed below with respect to FIG. 7.

The contact portion 104 includes an angled blade 4 which acts as part of a layer depositing apparatus by spreading out a pile of green material 6 (which in this embodiment is a fine grained (e.g. having an average particle size of 50-150 μm) polyamide powder, but may be ultra-high molecular weight polyethylene (UHMWPE) or high density polyethylene (HDPE), or any other suitable material, e.g. acrylonitrile butadiene styrene (ABS)) into a layer 7 as it is pushed in the direction of arrow 15. In this embodiment, the pile of green material 6 was heaped on the previously deposited layer 5 in front of the contact portion 104.

Figure 6:
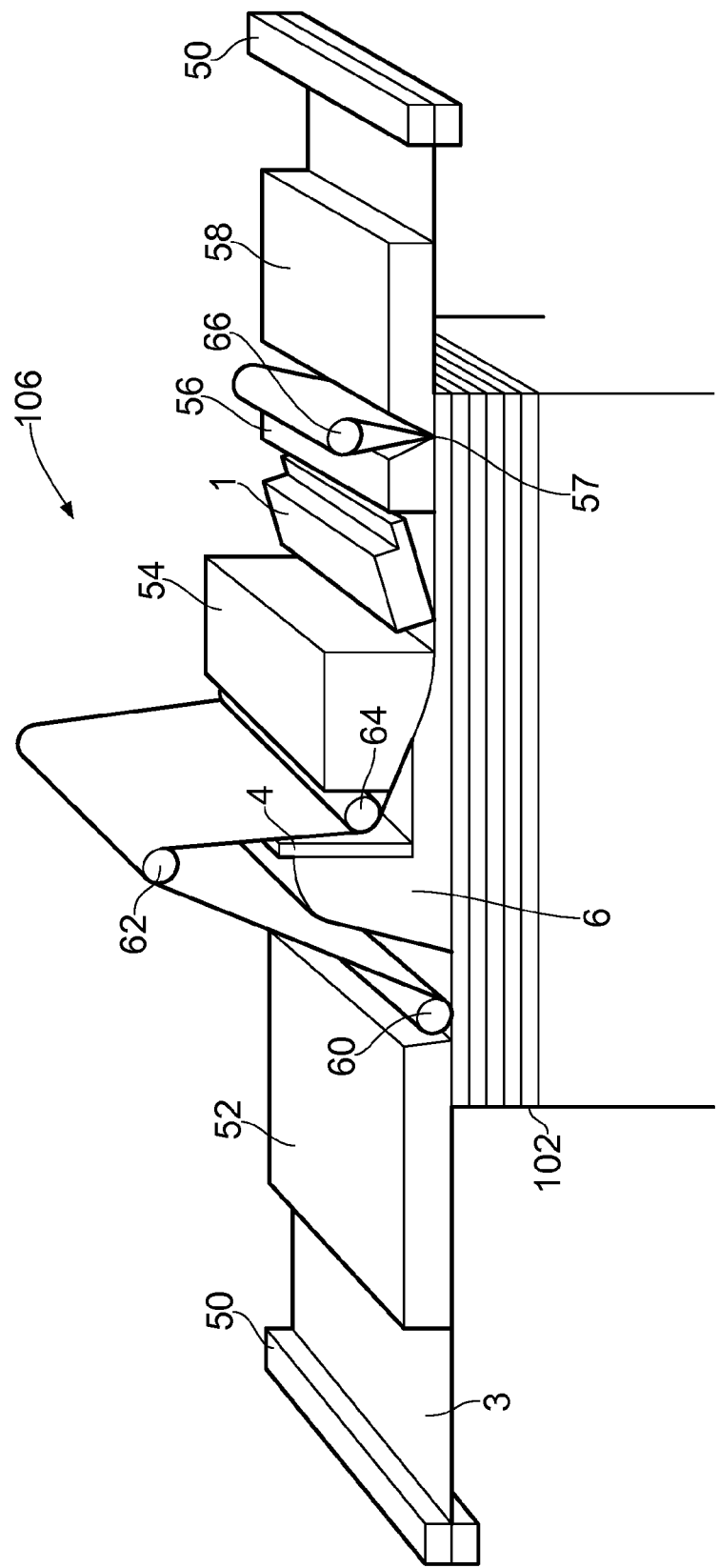
FIG. 6 is a schematic perspective view of a three-dimensional printer that is another embodiment of the invention.

The contact portion 104 comprises a rotatable drum 14 located after the angled blade 4. The rotating drum 14 may perform a dual function. Firstly it may act as part of the layer depositing apparatus by compacting (e.g. compressing) the layer 7 to promote the thermal conductivity and mechanical stability of the deposited green material. Secondly, it may act as a protective sheet feed mechanism, by which a protective sheet 3 is brought into contact with the deposited layer 7 beneath the active edge 2 of the thermal head 1. The thermal head 1 is thus protected from direct contact with the building material during heat treatment. Other articles may perform the compacting function. For example, a sloping plate may be arranged to exert a downwards pressure on a deposited layer of green material. In this case, compacting may be performed before the protective sheet is fed onto the layer, e.g. by a mechanism that is physically separate from the contact portion. However, it may also be possible for the sloping plate to perform both the compacting and the protective sheet feeding functions after the green material (e.g. powder) is distributed. The slope angle of the plate may be selected appropriately to achieve suitable compaction. The slope is preferably gentle, i.e. the change in height from the start of the blade to the end is small compared with the length of the blade. An example of this arrangement is shown in FIG. 6.

Figure 3:
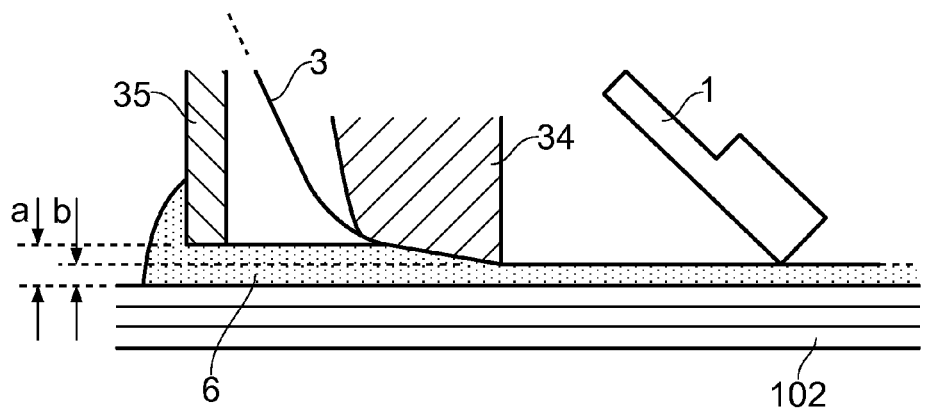
FIG. 3 is a cross-sectional view of a protective sheet feed mechanism in which an angled blade distributes the green material for use in another embodiment of the invention.
Figure 4:
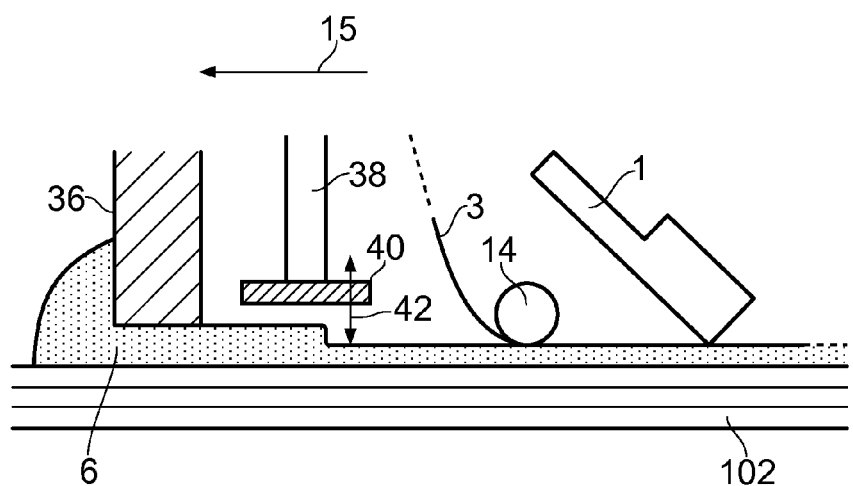
FIG. 4 is a cross-sectional view of layer depositing apparatus having a reciprocating stamper for use in another embodiment of the invention.

FIGS. 3 and 4 depict examples of types of layer depositing protective sheet feed mechanisms. In FIG. 3, the contact portion includes a distributing element 35, which spreads out evenly a substantially uncompacted layer of green material 6. Following the distributing element 35 is a compaction plate 34, which has a sloping undersurface for compacting the green material 6. In this embodiment, the compaction plate 34 also acts as a feed mechanism for the protective sheet 3. Here the front end of the compaction plate 34 is rounded to facilitate smooth slipping of the protective sheet 3 past the plate 34. Compaction causes the thickness of the layer to reduce from a to b. A compaction ratio may be defined as a:b. In one example, the compaction ratio may be about 2:1, but could be as much as 5:1. The compacted layer thickness b may be 0.1 mm. The compaction plate 34 and distributing element 35 may also act as an advance heater, as discussed below with respect to FIG. 6.

FIG. 4 shows an arrangement where the steps of distributing, compacting and protective sheet feeding take place at three separate locations. In this example, the green material is spread evenly by distributing element 36 and then compacted by stamping mechanism 38. In this embodiment, the stamping mechanism 38 forms part of and moves with the contact portion. It comprises a flat plate 40 that is arranged to reciprocate towards and away from the material bed in the directions indicated by arrow 42. The frequency of reciprocating movement is selected with reference to the speed at which the contacting portion moves over the material bed so that all the uncompacted material from the blade is stamped on at least once by the stamping mechanism 38. In other embodiments, the stamping mechanism may be provided after the protective sheet 3 is fed in. In yet further embodiments, the layer depositing and compacting steps may take place before the thermal head 1 is moved across the material bed. In this case, a large plate for compressing the entire surface of the material bed at the same time may be used. Again, the distributing element 36 and flat plate 40 may be used as advance heaters.

In this embodiment, the protective sheet is a heat conductive sheet of glass fiber enhanced PTFE having a thickness of about 0.08 mm. This material has suitable thermal and antistatic properties to permit heat treatment to take place whilst also resisting adhesion to or permitting easy removal from the heat-treated material.

Returning to FIG. 1, the contact portion 104 includes a sheet separating portion for pulling the protective sheet 3 away from the heat-treated layer 8, and specifically from the material 9 that has been transformed by the action of heat. In this embodiment, the sheet separating portion includes a roller 20 arranged to take the path of the protective sheet 3 away from the material bed 102 and a sharp back edge on the trailing component 13 of the contact portion 104, which permits an abrupt change of direction. The back edge and roller move in the direction of arrow 15 with the thermal head 1, whereas the movement of the protective sheet 3 is constrained as described below. The relative movement between the protective sheet 3 and the back edge therefore pulls the protective sheet 3 away from the heat-treated layer 8, thereby separating it from the transformed material 9. A knife-like element (not shown) may also be introduced in the direction of travel of the contact portion 104 to separate the transformed (e.g. cured) material 9 from the protective sheet 3. This may be done in addition to the sharp back edge 13 or as a stand alone separation device. The knife-like element may have a sharp edge located as close to the point of separation where the sheet is abruptly removed from the cured material. As the edge moves with the contact portion, it assists separation. The knife-like element may be applied to other embodiments, such as the one discussed below with reference to FIG. 2, or to an arrangement where the back edge of the thermal head is the point of separation.

In FIG. 1, the protective sheet 3 is mounted over the material bed 102 and deflected by rollers 14, 16, 20 and sharp back edge of trailing component 13 away from a equilibrium position into contact with the deposited layer 7. One end of the protective sheet is fixed to a stand 19 that is stationary relative to the material bed 102. The opposite end is attached via one or more resilient members (e.g. springs) 17 to a stand 18 that is also fixed relative to the material bed 102. The deflection by the rollers 14, 16, 20 and trailing component 13 away from the equilibrium position puts the protective sheet 3 in tension, regulated by the resilient members 17. In other embodiments the protective sheet itself may exhibit enough resilience to permit the resilient members to be omitted. See for example FIG. 6. The protective sheet 3 may also be mounted as a loop on the contact portion.

In operation, the thermal head 1 is moved in the direction of arrow 15 relative to the material bed 102. The thermal head 1, the three rollers 14, 16, 20, the angled blade 4, and the back edge all move together as one piece and thereby constitute the contact portion.

During movement over the deposited layer, the heat elements are switched on and off at desired intervals to transfer heat through the protective sheet 3 to heat treat the layer of green material. As described above, heat treatment is used herein to refer to any method of transform the green material for a formable state to a fixed state. For example, heat treatment may include melting the green material in a desired cross-section 9 of the model. The heating may be sufficient to bond any melting material in the heat treated layer to any previously melted material in the layer below, so that the successive cross-section areas are attached to one another.

To speed up the process and to reduce thermal tension in the constructed model, the contact portion 104 may include an advance heater 10, which transmits heat through the protective sheet 3 ahead of the thermal head 1. In this embodiment, the advance heater 10 is located immediately before the thermal head 1. The advance heater 10 is arranged to warm the deposited layer 7 over the entire width of the protective sheet 3 that a smaller amount of energy from the thermal head 1 is required to melt the desired cross-section area. The advance heater 10 thus warms the deposited layer to a temperature below the melting point of the green material, e.g. 5° C. or 10° C. below the melting point.

To facilitate the separation of the protective sheet 3 from the transformed material 9, a heat sink 11 is provided on the contact portion immediately after the thermal head 1. The heat sink 11 may act to cool the heat-treated material to bring it to a solidified state suitable separation from the protective sheet 3. The heat sink 11 is a temperature-controlled (i.e. heatable) element whose temperature is regulated to maintain a temperature gradient across the protective sheet 3 which promotes cooling at a desired (i.e. controllable) rate.

The relative heights of contact portion 104 and the material bed 102 may be adjustable, to permit successive layers to be deposited on top of the previously treated layers for the above described process to be repeat layer by layer until a desired three-dimensional model is constructed. In one embodiment, this may be achieved by lowering (e.g. by a layer's thickness) the material bed 102 relative to the contact portion 104.

Figure 2:
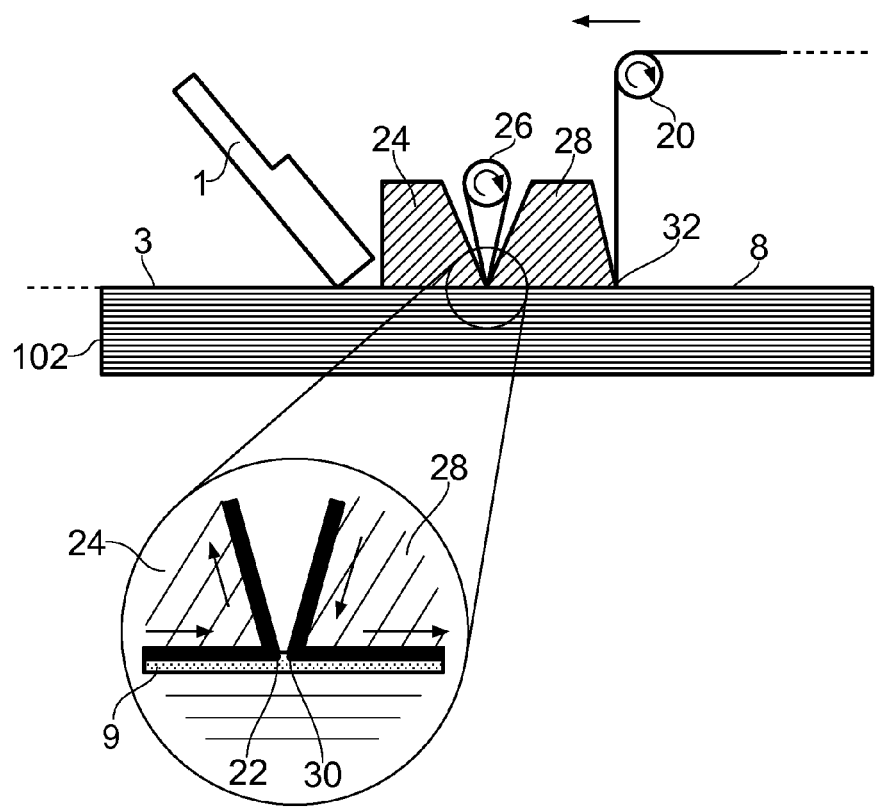
FIG. 2 is a cross-sectional view of a protective sheet separation mechanism suitable for use in another embodiment of the invention.

FIG. 2 shows an alternative mechanism for separating the protective sheet 3 from the heat-treated material 8. Components in common with FIG. 1 are given the same reference number and are not described again.

In the arrangement shown in FIG. 2, the protective sheet 3 is looped back into contact with the heat-treated material 9 at a first separation location to provide support for the heat treated material 9. The looped back section acts to hold down the heat treated material as separation takes place. Thus, in this arrangement the sheet separating process comprises two stages, which happen at a first and second separation location respectively. The first separation location is at a sharp back edge 22 of a first separator block 24, which may be an integral part of the contact portion 104 discussed above. Herein, "sharp edge" may mean a bevelled edge having a radius of 0.5 mm which provides a compromise between sharpness suitable for separation and smoothness for preventing damage to the protective sheet and reducing resistance to pulling the sheet.

The protective sheet 3 passes under the first separator block 24 and is pulled up abruptly from the back edge 22 under the action of separator roller 26, which also moves along with the contact portion 104 but is free to rotate to permit the protective sheet 3 to move relative to the contact portion 104. The protective sheet 3 is therefore separated from the heat-treated material (i.e. any bonding is broken) at the first separation location.

To prevent the heat-treated material 9 from being pulled out of the layer by the separation of the protective sheet 3, the contact portion 104 includes a second separator block 28 that has a front edge 30 is close proximity with the first separation location. The protective sheet 3 passes from the separator roller 26 under the second separator block 28 via the front edge 30. An earlier portion of the protective sheet 3 may thus be used to hold down the heat-treated material 9 while a later portion of the protective sheet 3 is separated. One advantage of this arrangement is that the heat-treated material is held down by a material that is known to be resistant to adhesion to it.

The second separator block 28 includes a back edge 32, from which the protective sheet 3 is pulled away from the heat-treated material by the action of roller 20.

Figure 5:
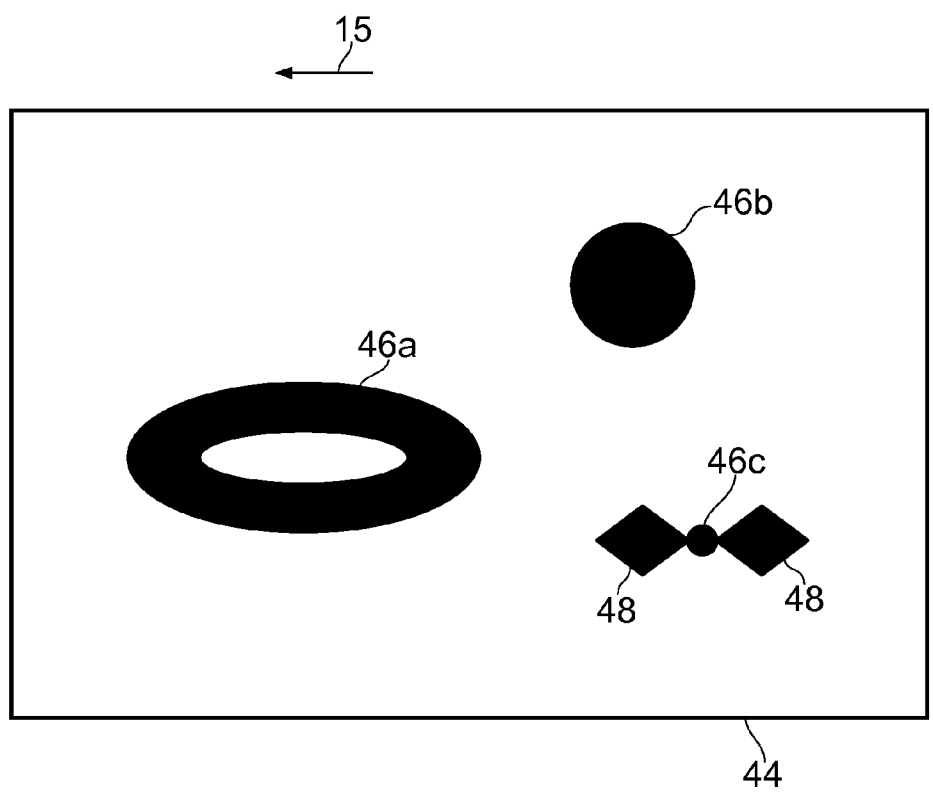
FIG. 5 is a schematic representation of a cross-sectional layer showing areas where the green material is to be transformed.

FIG. 5 shows a schematic plan view of a cross-sectional layer 44 identified by the software. The layer 44 corresponds with the heat-treatable area of the material bed 102. For convenience, the arrow 15 indicating the direction of movement of the thermal head 1 is shown. The software is arranged to process the three-dimensional modelling data (e.g. CAD data) to identify cross-sectional shapes 46a, 46b, 46c for the model. In this example, one of the cross-sectional shapes 46c is the beginning of a new feature. It is relatively small and there is no transformed material in the layer below for it to be fused to. The software may be arranged to identify such features, e.g. by size thresholds and/or in relation to transformed material in the layer below. To facilitate separation of the protective sheet from the small shape 46c, the software is arranged to cause anchor elements 48 to be formed with the small shape 46c. These shapes increase the size of the transformed area, and therefore aids clean separation. The anchor elements 48 may be snapped off when the model is complete.

FIG. 6 shows a preferred embodiment of a printer 106 according to the invention. Features in common with the embodiments discussed above are given the same reference numbers and are not discussed again. In this embodiment the protective sheet 3 is fixed between a pair of clamps 50. A pair of heating plates 52, 58 are provided at each end of the movable contact portion 104. The heating plates 52, 58 contact the material bed 102 through the protective sheet 3, and have their temperatures regulated to maintain the material bed at a substantially uniform temperature to prevent warping of the model under construction. For reasons of clarity, the total length of the heating plates and protective sheet is shortened in the drawing. In practice the heating plates are as long as the material bed and the protective sheet has a length to accommodate full movement of the contact portion from one side of the material bed to the other. The side walls and base of the material bed 102 may also incorporate heaters or insulation plates to help minimise the temperature gradient through the bed.

In this embodiment, three rollers 60, 62, 64 lift the protective sheet 3 away from the material bed 102, over the spreading blade 4 (which is upright in this example) and material 6 to be distributed, and back towards the material bed 102, where it is brought back into contact with the deposited layer by the compacting element 54. In this embodiment, the compacting element 54 has a sloping surface similar to the arrangement shown in FIG. 3. The compacting element 54 also incorporates a heater and performs the same function as the advance heater 10 discussed above.

Immediately after the thermal head 1 (i.e. preferably close enough to minimise exposure of the protective sheet to the surrounding environment) the contact portion includes a cooling element 56, which is a temperature-controlled member kept relatively cooler than the melting point of the heat-treated material to promote solidification to a level suitable for separation of the protective sheet 3. In this embodiment, the cooling element 56 also includes the separator, by having a sharp trailing edge 57 and a roller 66 for pulling the protective sheet 3 away from the material bed 102. As in the arrangement shown in FIG. 2, the protective sheet 3 is drawn back into contact with the deposited layer immediately after separation. In this case, the protective sheet passes under post-treatment heater 58 and is not separated again. This facilitates temperature regulation of the deposited layer and hence material bed 102 as a whole.

Figure 7:
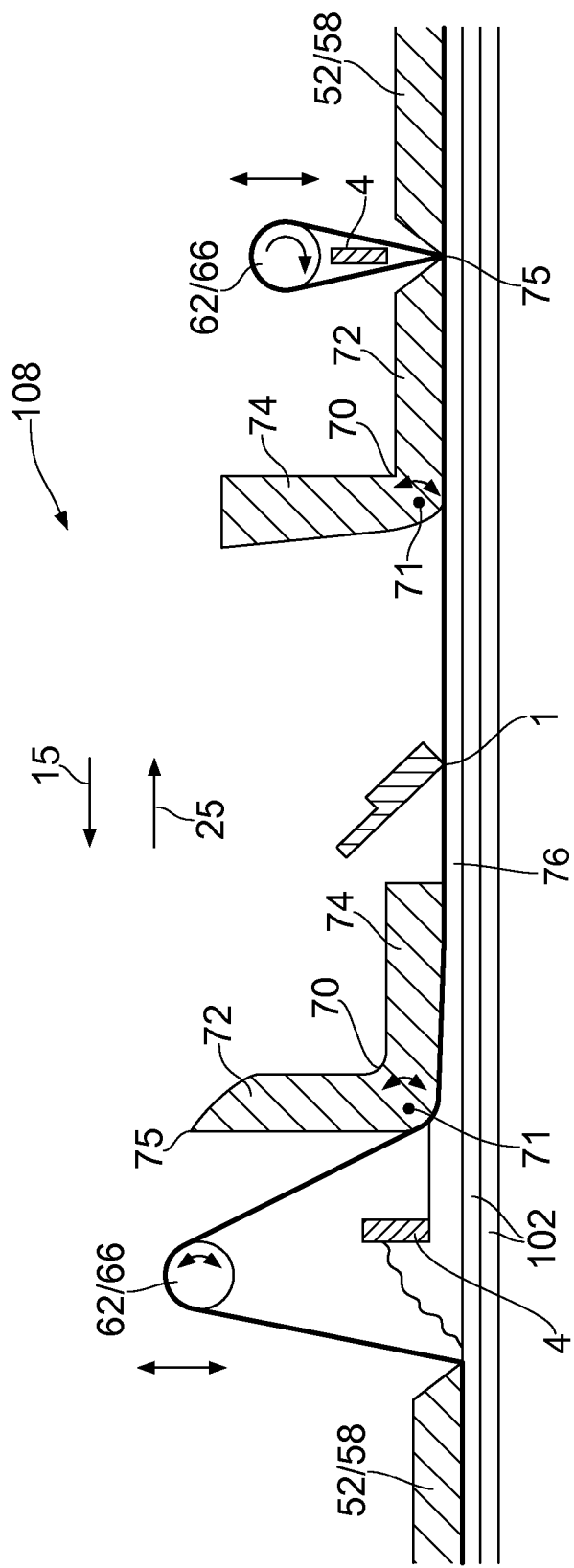
FIG. 7 is a schematic cross-sectional view of a three-dimensional printer with a reversible print mechanism that is yet another embodiment of the invention.

FIG. 7 shows a cross-sectional view through a printer 108 that is another embodiment of the invention. In this embodiment, the contact portion is reversible, i.e. can print in the opposite directions indicated by arrows 15, 25. In FIG. 7 the contact portion is in a configuration for printing in the direction of arrow 15, i.e. right to left across the page. Features in common with FIG. 6 are given the same reference numbers; where a feature has a dual function depending on the printing direction, it is given both relevant reference numbers.

Thus, the pair of heating plates 52/58 provided at each end of the movable contact portion perform pre- or post-treatment heating depending on the printing direction. In this embodiment a pair of spreading blades 4 are provided on each side of the thermal head 1, each blade being provided in conjunction with a roller 62/66 which acts to pull the protective sheet away from the material bed 102. Each spreading blade 4 is movable relative to the material bed between an operating configuration for spreading the flowable green material and a non-operating configuration in which it performs no function. Each roller 62/66 may be movable too, e.g. between a first position for taking the protective sheet 3 around the blade 4 when it is in the operating configuration and a second position for pulling the protective sheet 3 away from the separator. Of course, two or more rollers may be used to perform the same function as the each roller 62/66 depicted in FIG. 7.

The functions of the compacting element, advance heater, separator and cooling element are provided by a pair of switchable dual-function members 70, which are disposed one on each side of the thermal head 1. Each dual-function member 70 is hinged about a rotation axis 71 such that either a compacting portion 74 or a cooling portion 72 contact the deposited layer 76 through the protective sheet 3 before or after heat-treatment respectively.

The compacting portion 74 has the sloping surface similar to the arrangement shown in FIG. 3 and also incorporates a heater to perform the same function as the advance heater 10 discussed above. The cooling portion 72 includes a temperature-controlled member kept relatively cooler than the melting point of the heat-treated material to promote solidification to a level suitable for separation of the protective sheet 3, and also includes the separator, by having a sharp trailing edge 75.

The invention claimed is:

1. A printer for building a three-dimensional model by sequential deposition of a plurality of cross-sectional layers, the printer comprising:
a material bed; a layer depositing mechanism for depositing a layer on the material bed; a thermal head movable relative to the material bed over the deposited layer; and a protective sheet in direct contact with the thermal head, wherein the thermal head generates thermal energy and comprises an array of selectively activatable heating elements arranged to transfer the thermal energy by conduction through the protective sheet to heat-treat a selectable area of green material in the deposited layer, and wherein the layer depositing mechanism includes a spreading element movable relative to the material bed for spreading a layer of flowable green material on the material bed.

2. A printer according to claim 1 including a movement mechanism for moving the thermal head on a fixed path relative to the material bed, wherein the array of selectively activatable heating elements extends in a direction that is at an angle to the direction of the fixed path.

3. A printer according to claim 2, wherein the spreading element is in front of and movable with the thermal head over the material bed.

4. A printer according to claim 1 including an advance heater located before and arranged to move with the thermal head on its path over the deposited layer to pre-heat the green material.

5. A printer according to claim 1 wherein the protective sheet is disposed between the array of heating elements and the deposited layer during heat treatment.

6. A printer according to claim 5 including a protective sheet feed mechanism arranged to feed the protective sheet into contact with the deposited layer beneath the array of selectively activatable heating elements.

7. A printer according to claim 5 including a protective sheet separation mechanism arranged to separate the protective sheet from the heat-treated selectable area after heat treatment.

8. A printer according to claim 5, wherein the thermal head is arranged to move relative to the protective sheet during heat treatment, the protective sheet being held substantially stationary with respect to the material bed.

9. A printer according to claim 4 comprising:
a contact portion arranged to move over the material bed, the contact portion being formed of the layer depositing mechanisim, the advance heater and the thermal head arranged in order along the path of travel over the material bed; and
the protective sheet for positioning between the array of heating elements and the deposited layer during heat treatment,
wherein the contact portion includes:
a sheet receiving portion to receive the protective sheet and feed it between the advance heater and deposited layer, and
a sheet separating portion for separating the protective sheet from the deposited layer after heat treatment.

10. A printer according to claim 1 including a cooling element located after the thermal head along its path of travel over the material bed.

* * * * *